(12) United States Patent
Dyba

(10) Patent No.: US 11,763,434 B2
(45) Date of Patent: Sep. 19, 2023

(54) IMAGE PROCESSING SYSTEM

(71) Applicant: LEICA MICROSYSTEMS CMS GMBH, Wetzlar (DE)

(72) Inventor: Marcus Dyba, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 18/078,138

(22) Filed: Dec. 9, 2022

(65) Prior Publication Data

US 2023/0196531 A1 Jun. 22, 2023

(30) Foreign Application Priority Data

Dec. 16, 2021 (EP) .................................... 21214996

(51) Int. Cl.
*G06T 5/50* (2006.01)
*G06T 3/40* (2006.01)
(Continued)

(52) U.S. Cl.
CPC ............... *G06T 5/50* (2013.01); *G06T 3/40* (2013.01); *G06T 5/002* (2013.01); *G06T 5/20* (2013.01);
(Continued)

(58) Field of Classification Search
CPC .. G06T 5/50; G06T 3/40; G06T 5/002; G06T 5/20; G06T 2207/10056;
(Continued)

(56) References Cited

U.S. PATENT DOCUMENTS 9,295,431 B2 * 3/2016 Hong .................. G06T 7/571
2007/0230760 A1   10/2007 Omi et al.
(Continued)

FOREIGN PATENT DOCUMENTS

WO    WO-03090113 A1 * 10/2003 ............. G06T 5/002
WO    WO 2020/172123 A1   8/2020
WO    WO-2020172123 A1 * 8/2020 ............. G02B 21/16

OTHER PUBLICATIONS

S. K. Maji et al., "Joint denoising-deconvolution approach for fluorescence microscopy," 2016 IEEE 13th International Symposium on Biomedical Imaging (ISBI), Apr. 2016, pp. 128-131, IEEE, US.

(Continued)

*Primary Examiner* — Jose L Couso
(74) *Attorney, Agent, or Firm* — Leydig, Voit & Mayer, Ltd.

(57) ABSTRACT

An image processing system, includes a processor, wherein the processor is configured to obtain image pixel data generated by an optical imaging system of a microscope, to perform deconvolution processing on the obtained image pixel data for generating deconvolved image pixel data, to perform denoising processing on the obtained image pixel data for generating denoised image pixel data, to obtain a sampling density based on which the image pixel data is generated by the optical imaging system, and to mix the deconvolved image pixel data and the denoised image pixel data for generating mixed image pixel data with a weighting dependent on the sampling density to change a ratio of the deconvolved image pixel data in relation to the denoised image pixel data when the sampling density exceeds an oversampling limit.

17 Claims, 4 Drawing Sheets

(51) Int. Cl.
*G06T 5/00* (2006.01)
*G06T 5/20* (2006.01)

(52) U.S. Cl.
CPC ............... *G06T 2207/10056* (2013.01); *G06T 2207/20212* (2013.01)

(58) Field of Classification Search
CPC . G06T 2207/20212; G06T 5/003; G06T 5/10; G06T 2207/10064; G06T 2207/10061; G06T 2207/30024; G06T 2207/20221; G06T 2200/04; G06T 2207/30004; G06T 7/4053; G06T 7/97; H04N 13/395; H04N 25/671; H04N 25/67; G02B 21/06; G02B 21/16; G02B 21/36; G02B 21/364; G02B 21/365; G02B 21/367
See application file for complete search history.

(56) References Cited

U.S. PATENT DOCUMENTS

| | | | | |
|---|---|---|---|---|
| 2014/0263963 | A1* | 9/2014 | Broxton | H04N 23/00 250/208.1 |
| 2016/0327779 | A1* | 11/2016 | Hillman | G02B 21/0032 |
| 2017/0205615 | A1* | 7/2017 | Vaziri | H04N 13/232 |
| 2021/0116380 | A1* | 4/2021 | Ma | G06T 3/4053 |
| 2021/0302316 | A1* | 9/2021 | Walter | G01N 21/6458 |
| 2021/0334957 | A1* | 10/2021 | Ballinger | G06T 7/0012 |
| 2022/0076379 | A1* | 3/2022 | Kleppe | G02B 21/367 |
| 2022/0187583 | A1* | 6/2022 | Owens | G02B 21/008 |
| 2022/0277427 | A1* | 9/2022 | Bromberg | H01J 37/222 |

OTHER PUBLICATIONS

Pnevmatikakis, E.A. et al., "Simultaneous Denoising, Deconvolution, and Demixing of Calcium Imaging Data", Neuron. 89. 10.1016/j.neuron.2015.11.037, Jan. 20, 2016, Elsevier Inc., Netherlands, pp. 1-32.

* cited by examiner

IMAGE PROCESSING SYSTEM

CROSS-REFERENCE TO PRIOR APPLICATION

This application claims benefit to European Patent Application No. EP 21214996.7, filed on Dec. 16, 2021, which is hereby incorporated by reference herein.

FIELD

The present invention relates to an image processing system, a microscope comprising an optical imaging system and an image processing system, a method for image processing, and a computer program with a program code for performing such a method.

BACKGROUND

Deconvolution and denoising are well-known image optimization algorithms used for various imaging modalities including for instance fluorescence microscopy and confocal beam scanning microscopy. Usually, deconvolution and denoising are performed as part of image post-processing, i.e. only after the microscopic imaging process.

Deconvolution serves to recover spatial structures of an original object to be imaged, these structures being blurred due to limited spatial resolution of an optical imaging system of the microscope. In conventional deconvolution approaches, a recovery of the original object from a blurred image is achieved by virtually inverting the imaging process. The inversion process is based on an a priori knowledge of the image projection behavior of the optical imaging system. This knowledge of the image projection behavior is represented by the so-called point-spread-function (PSF). The PSF represents a blurred image of an ideally point-like object imaged through the optical system onto an image plane. A spatial extension of the PSF is a measure of the spatial resolution of the optical imaging system. An ideal deconvolution algorithm would recover a point as an original object from an input image represented by the PSF.

There are also deconvolution algorithms which do not rely on a PSF which is known in advance. Rather, those so-called blind deconvolution algorithms serve to recover an unknown PSF from the image itself. Both types of algorithms, i.e. conventional deconvolution with a priori knowledge of the PSF and blind deconvolution without such knowledge, aim to invert image blurring and loss of spatial information caused by imperfect image projection through the optical imaging system.

As a pre-condition for deconvolution, the image to be deconvolved must be oversampled. Oversampling means that a sampling density based on which the image pixel data is generated by the optical imaging system exceeds a threshold that is represented by the Nyquist criterion. Specifically, a pixel size of the image detector must be smaller than the spatial resolution of the optical imaging system. Preferably, a pixel size of the image detector should be smaller than half of the spatial resolution of the optical imaging system (Nyquist criterion). In other words, in case of oversampling, the PSF is spatially resolved with multiple pixels. If the pre-condition of oversampling is not met, meaningful deconvolution is not possible. Rather, in case of deconvolving an undersampled image, artefacts occur that render the deconvolution useless or even disadvantageous.

In contrast to deconvolution, denoising algorithms do not enhance the spatial resolution of the image. Rather, denoising algorithms extract an estimated real intensity of each pixel of a noisy image, i.e. an image with limited signal and/or acquired by a non-perfect detector. Furthermore, as a significant difference compared to deconvolution, denoising does not require oversampling. For instance, mobile phone cameras typically apply denoising to images which are not oversampled.

As mentioned above, conventional microscope systems are offering deconvolution and denoising algorithms in the post-processing stage to improve the quality of microscope images that have already been recorded. In view of the deviating pre-conditions, deconvolution and denoising are usually applied alternatively although there are some deconvolution algorithms that take advantage of embedded denoising to reduce the risk of image artefacts. Examples are disclosed in the publication of S. K. Maji et al., "Joint denoising-deconvolution approach for fluorescence microscopy," 2016 IEEE 13th International Symposium on Biomedical Imaging (ISBI), 2016, pp. 128-131, doi: 10.1109/ISBI.2016.7493227, and the publication of Pnevmatikakis et al., "Simultaneous Denoising, Deconvolution, and Demixing of Calcium Imaging Data", Neuron. 89. 10.1016/j.neuron.2015.11.037. However, in these examples, denoising becomes an embedded step of deconvolution, and deconvolution is still limited to oversampled images only. Accordingly, these approaches are not applicable at sampling densities that fall within a regime of undersampling.

SUMMARY

In an embodiment, the present disclosure provides an image processing system, comprising a processor, wherein the processor is configured to obtain image pixel data generated by an optical imaging system of a microscope, to perform deconvolution processing on the obtained image pixel data for generating deconvolved image pixel data, to perform denoising processing on the obtained image pixel data for generating denoised image pixel data, to obtain a sampling density based on which the image pixel data is generated by the optical imaging system, and to mix the deconvolved image pixel data and the denoised image pixel data for generating mixed image pixel data with a weighting dependent on the sampling density to change a ratio of the deconvolved image pixel data in relation to the denoised image pixel data when the sampling density exceeds an oversampling limit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
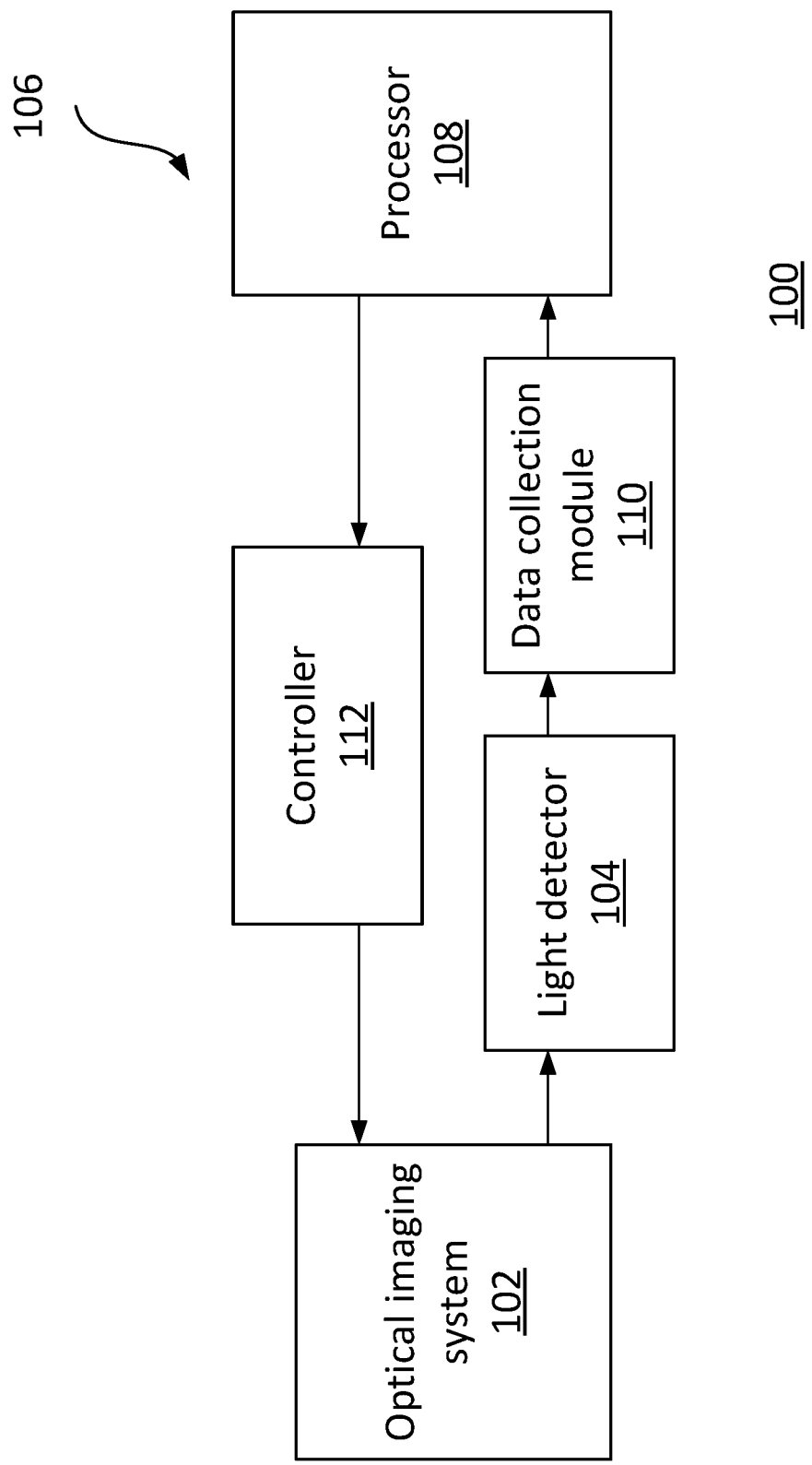
FIG. 1 illustrates a block diagram of a microscope according to an embodiment.

In an embodiment, the present invention provides an image processing system, a microscope, a method for image processing, and a computer program that enable image improvement over a wide range of sampling densities.

An image processing system comprises a processor. The processor is configured to obtain image pixel data generated by an optical imaging system of a microscope. The processor is further configured to perform deconvolution processing on the obtained image pixel data for generating deconvolved image pixel data. The processor is configured to perform denoising processing on the obtained image pixel data for generating denoised image pixel data. The processor is configured to obtain a sampling density based on which the image pixel data is generated by the optical imaging system. The processor is configured to mix the deconvolved image pixel data and the denoised image pixel data for generating mixed image pixel data with a weighting dependent on the sampling density to change—in particular to increase—a ratio of the deconvolved image pixel data in relation to the denoised image pixel data when the sampling density exceeds an oversampling limit.

In an embodiment, the present invention provides for a joint approach of deconvolution and denoising which can be automatically applied to improve image quality irrespective of a sampling density based on which the microscopic images is acquired. In particular, according to an embodiment, the image processing system can be used to jointly apply deconvolution and denoising to microscope images during real-time recording with prior unknown and potentially changing imaging parameters. Thus, deconvolution and denoising filtering in real-time and during a live setup of the microscope is achieved.

Therefore, a typical problem of conventional deconvolution approaches can be avoided. Thus, as explained above, a prerequisite for conventional deconvolution is oversampling which makes an increase of spatial resolution by deconvolution possible in the first place. However, the condition of oversampling is not guaranteed during a real-time setup. Rather, the sampling density may vary during real-time imaging if a user changes imaging parameters such as a zoom setup, a scan field, etc. at a constant pixel number of the image detector. With varying imaging parameters, the sampling density might change from oversampling to undersampling, and deconvolution is no longer useful or even detrimental to the reliability of the intended image improvement. As a result, real-time deconvolution during imaging with varying the sampling density is not possible in conventional systems.

This problem is overcome by the image processing system enabling real-time image improvement aided by deconvolution and denoising. An insight underlying the proposed solution is that deconvolution is technically hindered once image parameters are changing from the oversampling regime to the non-oversampling regime during the microscope setup or e.g. by a change of relevant imaging parameters of the microscope during image acquisition. In such a situation, image data would no longer benefit from a hypothetically possible deconvolution since pixel resolution is no longer sufficient to represent sub-PSF sized structures anyway. However, denoising would still be possible and also desired. Another insight is that a spontaneous change from one to the other image improvement algorithm (which might be considered as a trivial solution to the problem) should be avoided since such a change would lead to irritating changes in live image streams. Thus, simply switching from one image improvement technique to another would be simple, but not satisfactory.

In an embodiment, the present invention provides a joint approach of deconvolution and denoising preferably executed in real-time during the acquisition of a live imaging stream of the optical imaging system and subsequent weighted mixing of the deconvolution and denoising results. On the one hand, this weighted mixing is preferably performed such that deconvolution is dominating the overall result when the sampling density exceeds an oversampling limit caused by currently imaging conditions during the life imaging stream. On the other hand, when the imaging conditions are below the oversampling limit, essentially pure denoising may be weighted to the output image. In a parameter regime close to the oversampling limit, the weighting of one image improvement approach to the other may be changed monotonically and continuously in order to avoid spontaneous changes of the image data stream. As a result, the proposed image processing system allows visualization of dim, noisy and spatially hardly resolvable structures during live imaging in light microscopes, especially fluorescence microscopes.

It is to be noted that the image processing system can be advantageously used for image enhancement in real-time imaging, as explained above. However, it is by no means limited to an application in real-time imaging. Rather, the joint approach of deconvolution and denoising can also be applied to post-image processing (off-line) with great benefit.

It is further to be noted that the weighting of one image improvement approach to the other can also be influenced other by image parameters, i.e. not only by the sampling density. For instance, the weighting can also be adjusted depending on the image intensity and/or the signal-to-noise ratio. Thus, in highly noisy images, deconvolution may be more problematic, and it may be advantageous to weight the overall mix of deconvolution and denoising in favor of the denoising result.

In an embodiment, the oversampling limit is defined by a pixel size being smaller than the spatial resolution of the optical imaging system. In an embodiment, the oversampling limit is defined by a pixel size being equal or smaller than half of the spatial resolution of the optical imaging system. In particular, the oversampling limit may be defined by the Nyquist criterion.

The processor may be configured to determine the weighting based on a characteristic representing a deconvolution weighting factor that increases monotonically and linearly or non-linearly with increasing sampling density at least in a range including the oversampling limit. Thus, the characteristic can be considered as a function of parameters affecting the sampling density.

The processor may be configured to determine the weighting based on a characteristic representing a deconvolution weighting factor that is zero when the sampling density is smaller than the oversampling limit and that increases monotonically and non-nonlinearly with increasing sampling density when the sampling density is equal to or greater than the oversampling limit. Thus, deconvolution which is meaningless or even detrimental due to artefacts can be avoided in the undersampling regime. Thus, deconvolution may be omitted altogether under the condition of undersampling. In contrast, applying the deconvolution process in the oversampling regime enables an enhancement of spatial resolution.

Preferably, the monotonic and linearly or non-linear increase of the characteristic is predominantly limited to a range around or at the oversampling limit. This embodiment is based on the insight that the resolution enhancing effect of deconvolution drastically increases as soon as the oversampling limit is reached.

In any case, the aforementioned characteristic represents a weighting function which may be predefined and static without being limited thereto. Rather, the weighting function may also be adopted to the current imaging situation so that the weighting function may depend e.g. on the signal-to-noise ratio, the intensity of the detection light, the scan speed etc.

The aforementioned range may have a width being one of the following: seven times, five times, tree times, two times or one time of the—preferably—spatial resolution of the optical imaging system.

The processor may be configured to generate the mixed image pixel data while changing the weighting as the sampling density varies. A variation of the weighting can be determined taking into account properties of the specific algorithms for deconvolution and denoising.

The processor may be configured to obtain the sampling density based on at least one imaging parameter and to determine the weighting in accordance with the sampling density. The image parameters may include parameters affecting e.g. a zoom setup for finding a suitable region of interest (ROI) such as a scan field in confocal microscopy.

According to an embodiment, the processor may be configured to perform the deconvolution processing based on a point spread function (PSF) characterizing the spatial resolution of the optical imaging system. The PSF may be known in advance taking into account the optical characteristics of the imaging system. Alternatively, the PSF may not be a priori unknown and derived from the image in accordance with the principle of blind deconvolution.

The deconvolution processing and the denoising processing may be performed at least one of independently and simultaneously. In particular, deconvolution and denoising are preferably executed in the background as separate image enhancement processes. Subsequently, the results of these processes are merged into an overall result according to the weighting depending on the sampling density. The image data mixing may be performed pixel by pixel so that mixed image pixel data are generated based on deconvolved image pixel data and the denoised image data, with the mixing ratio being dependent on the sampling density.

The deconvolution processing may comprise at least one of the following: Wiener deconvolution, Richardson-Lucy deconvolution, FFT based deconvolution, Agard-Sedat deconvolution and Meinel deconvolution.

The denoising processing may comprise at least one of the following: smoothing, deblurring, averaging of multiple images, and background subtraction.

The processor may comprise at least one of a CPU (Central Processing Unit), GPU (Graphics Processing Unit), FPGA (Field Programmable Gate Array), ASIC (Application-Specific Integrated Circuit), and DSP (Digital Signal Processor).

The image processing system may be configured to be used in widefield microscopy, laser scanning microscopy, fluorescence microscopy, transmitted or reflected light microscopy, multi-photon microscopy, super-resolution microscopy, interference contrast or polarization microscopy.

According to an aspect, a microscope is provided comprising an optical imaging system and an image processing system is described above.

According to an aspect, a method for image processing is provided, comprising the following steps: obtaining image pixel data generated by an optical imaging system of a microscope; performing deconvolution processing on the obtained image pixel data to generate deconvolved image pixel data; performing denoising processing on the obtained image pixel data to generate denoised image pixel data; obtaining a sampling density based on which the image pixel data generated by the optical imaging system; and mixing the deconvolved image pixel data and the denoised image pixel data to generate mixed image pixel data with a weighting dependent on the sampling density to change—in particular to increase—a ratio of the deconvolved image pixel data in relation to the denoised image pixel data when the sampling density exceeds an oversampling limit.

According to an aspect, a computer program is provided with a program code for performing the method described above, when the computer program is run on a processor.

FIG. 1 is a block diagram showing a microscope 100 according to an embodiment. The microscope 100 may be a confocal laser scanning microscope without being limited thereto. FIG. 1 shows only those components of the microscope 100 which are helpful to understand the operating principle. Needless to say that the microscope 100 may include additional components such as a light source for emitting an illumination light beam, a scanner by which the light beam is scanned across a sample to illuminate the same point by point, a pinhole for eliminating out-of-focus light in image in formation, etc.

The microscope 100 comprises an optical imaging system 102 which collects detection light from an illuminated point of the sample and directs the detection light onto a light detector 104. The light detector 104 may be a photomultiplier tube (PMT) or avalanche photodiode which converts the detection light into an electrical image signal corresponding to one pixel. As a result, the optical imaging system 102 interacts with the light detector 104 in accordance with the principle of confocal imaging to generate point-by-point image pixel data representing an optical image of the sample.

The microscope 100 further includes an image processing system 106 with a processor 108 that may comprise a CPU, GPU, FPGA, ASIC, and/or DSP without being limited thereto. The image processing system 106 may further include a data collection module 110 which is connected to the detector 104 for receiving the image pixel data therefrom. The processor 108 is configured to obtain the image pixel data from the data collection module 110 and to process the data as explained below.

According to the embodiment shown in FIG. 1, the microscope 100 comprises a controller 112 which is connected to the processor 108 and configured to control the optical imaging system 102 in accordance with instructions received from the processor 108. The processor 108 may instruct the controller 112 to set specific imaging parameters in response to a user input. For example, the user may change parameters during imaging such as a scan field to identify an ROI of the sample by zooming in or out and to focus the optical imaging system onto the ROI. Further imaging parameters that may be varied include for example an exposure time, a scan speed, specific detector settings, pinhole settings etc.

The processor 108 is configured to perform both deconvolution and denoising processing on the image pixel data that is obtained from the optical imaging system 102. Accordingly, the image pixel data generated by the optical imaging system 102 may be considered as raw image data from which the processor 108 derives deconvolved image pixel data as well as denoised image pixel data by applying a suitable deconvolution and denoising algorithms, respectively. For example, the processor 108 may apply algorithms such as Wiener deconvolution, Richardson-Lucy deconvolution, blind deconvolution (i.e. deconvolution without a priori knowledge of the PSF), FFT based deconvolution, Argard-Sedat deconvolution and Meinel deconvolution in order to deconvolve the raw image data. With regard to denoising, the processor 108 may apply algorithms such as smoothing, deblurring, averaging of multiple images and background subtraction. Needless to say that suitable algorithms are not limited to the examples mentioned above.

As explained above, pre-condition for effective deconvolution is oversampling. Accordingly, a sampling density based on which the optical imaging system 102 generates the image pixel data representing the raw image data for deconvolution should exceed an oversampling limit. The sampling density is larger than the oversampling limit when a pixel size of the detector 104 is smaller than the spatial resolution of the optical imaging system 102. The oversampling limit may be defined by the Nyquist criterion which requires a sampling interval which is equal to twice the highest spatial frequency of the sample to accurately preserve the spatial resolution of the resulting digital image.

Taking into account the aforementioned pre-condition, the processor 108 is adapted to determine a weighting that depends on the sampling density. Based on the weighting, the results of deconvolution and denoising are merged to an overall result representing a mix of deconvolved and denoised image pixel data. Preferably, the processor determines the weighting such that a ratio of the deconvolved image pixel data is increased in relation to the denoised image pixel data when the sampling density exceeds the oversampling limit. Thus, if the sampling density is too low to render deconvolution effective, denoising will predominate the resulting image pixel data. If, on the other hand, the sampling density is high enough to render deconvolution effective, deconvolution will predominate the resulting image pixel data. Two examples for such a weighted mixing of deconvolution and denoising in the resulting image pixel data are illustrated in FIGS. 2 and 3.

Figure 2:
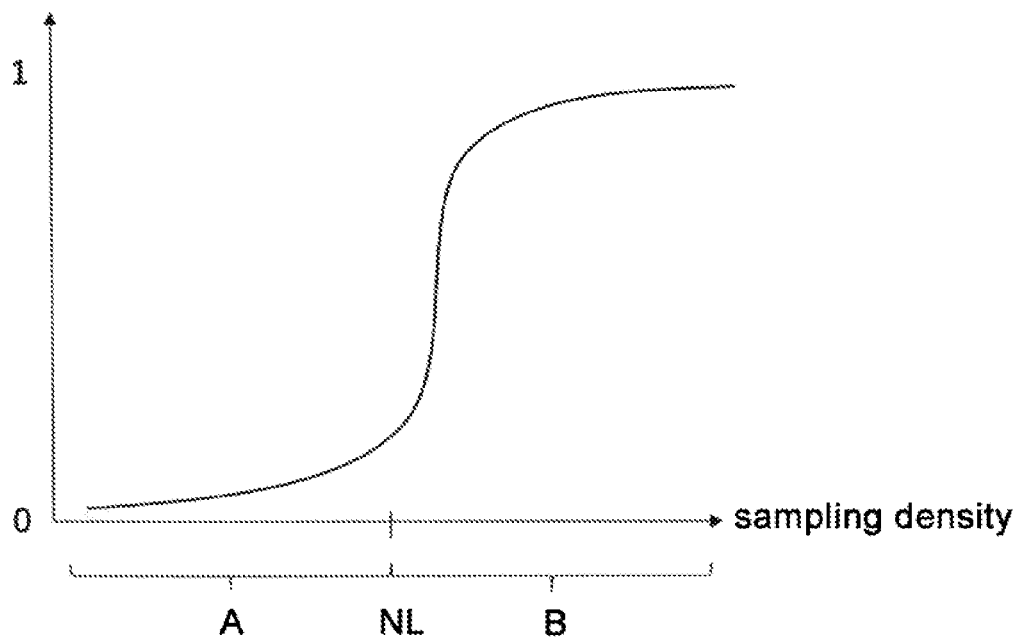
FIG. 2 illustrates a diagram showing a characteristic of a weighting factor depending on a sampling density according to an embodiment.

FIG. 2 is a diagram illustrating a characteristic that defines a weighting factor W-DECON depending on the sampling density which may vary during real-time imaging. The weighting factor W_DECON determines the ratio of the deconvolved image pixel data in relation to the denoised image pixel data in the mixed image pixel data. The weighting factor W_DECON is complementary to a weighting factor W_DENOISE that determines a ratio of the denoised image pixel data. Accordingly, the weighting factors W_DECON and W_DENOISE sum up to 1.

In FIG. 2, the abscissa designates the sampling density, and the ordinate designates the weighting factor W_DECON (=1−W_DENOISE). The range of the sampling density is divided into a regime A of undersampling and a regime B of oversampling. The regimes A and B are separated by an oversampling limit NL which is determined by the Nyquist criterion. Roughly speaking, deconvolution is essentially ineffective in regime A, while deconvolution is essentially effective in regime B. According to the characteristic of FIG. 1, the deconvolution weighting factor W_DECON increases non-nonlinearly with increasing sampling density. In an intermediate range between the regimes A and B around the oversampling limit N, the deconvolution weighting factor W_DECON increases steeply from a value close to 0 to a value close to 1 according to a non-linear characteristic. Thus, the most prominent change of the weighting factor W_DECON occurs at the oversampling limit N where, with decreasing sampling density, deconvolution is still possible but becomes less and less effective. Furthermore, the characteristic shown in FIG. 2 changes continuously so that spontaneous changes in image perception due to an abrupt switch from denoising to deconvolution and vice versa are avoided. This is particularly advantageous if the sampling density is varied during real-time imaging by changing one or more parameters such as by performing an operation of zooming in or out in order to find a suitable ROI of the sample.

Figure 3:
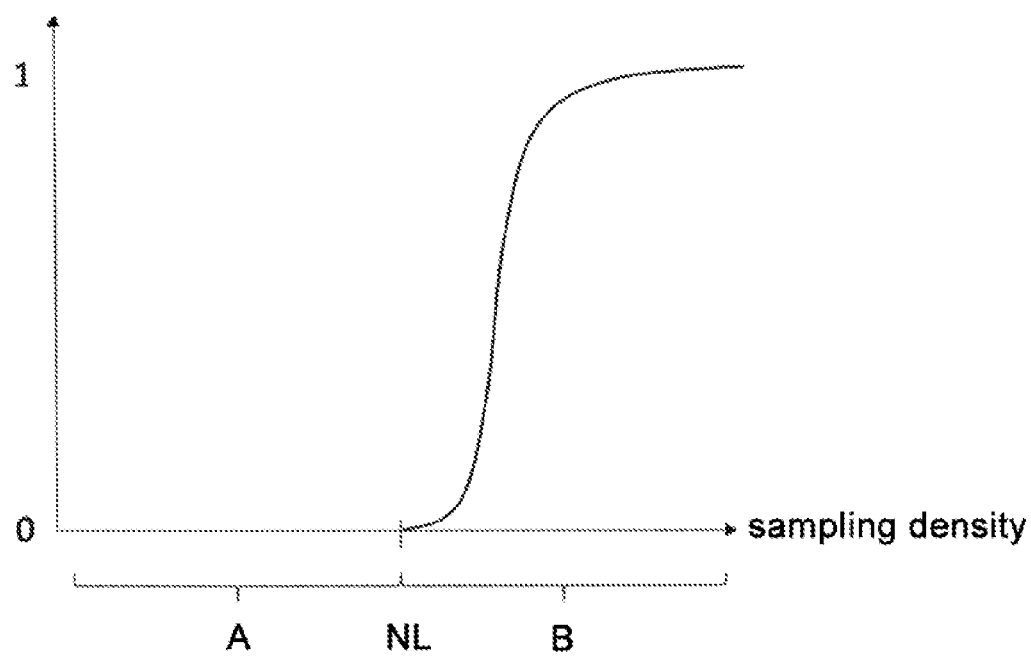
FIG. 3 illustrates a diagram showing a characteristic of a weighting factor depending on a sampling density according to an embodiment.

FIG. 3 shows another example of a characteristic based on which the processor 108 determines the deconvolution weighting factor W_DECON. According to the characteristics of FIG. 3, the deconvolution weighting factor W_DECON is zero when the sampling density is smaller than the oversampling limit N. Starting from the oversampling limit N, the weighting factor W_DECON steeply increases according to a non-linear characteristic up to a value close to 1. Thus, deconvolution which is meaningless or, with regard to artefacts generated by an amplification of noise, even detrimental can be avoided in the undersampling regime A. Thus, deconvolution may be omitted altogether in the undersampling regime A. On the other hand, resolution improvement is guaranteed in the oversampling regime B where deconvolution becomes effective and accurate.

In order to determine a suitable weighting for mixing the deconvolved image pixel data and the denoised image pixel data, the processor 108 is configured to obtain the sampling density that is currently set when the image pixel data is generated. To this end, the processor 108 may obtain one or more imaging parameters that are currently set and affect the sampling density such as a spatial resolution of the optical imaging system 102, a pixel size, a scan field etc. and determine the corresponding sampling density based on these parameter using a characteristic as shown by examples in FIGS. 2 and 3. The characteristic may be predefined. Alternatively, the characteristic may be adopted by the processor 108 in real-time taking into account the current imaging situation. In other words, the characteristic is updated as a function of parameters such as signal-to-noise ratio, intensity, scan speed etc.

Figure 4:
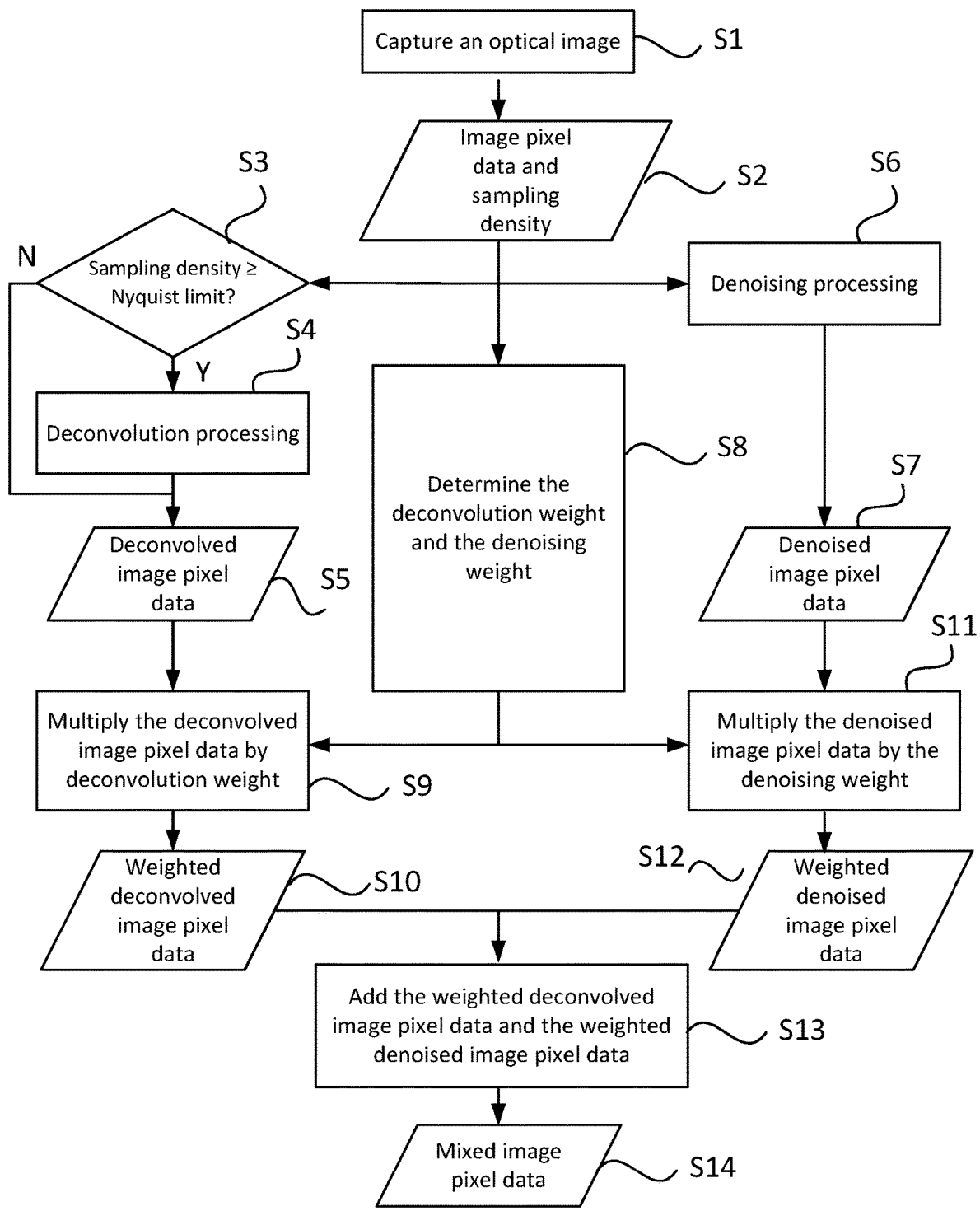
FIG. 4 illustrates a flow diagram illustrating a method for image processing according to an embodiment.

FIG. 4 shows a flow diagram illustrating a method that is executed by the image processing system 106 of the microscope 100 for generating a weighted mix of deconvolved image pixel data and the denoised image pixel data according to an embodiment. According to this embodiment, the method is performed during real-time imaging without being limited thereto.

The method of FIG. 4 starts in step S1 in which the optical imaging system 102 captures an optical image of the sample, and the detector 104 converts the optical image into an electrical image signal. The image signal is stored in the data collection module 110 in form of digital image pixel data. Furthermore, the processor 108 obtains one or more imaging parameters and determines the current sampling density based on these parameters. Accordingly, in step S2, the image pixel data and the sampling density are available for further processing.

According to the embodiment shown in FIG. 4, it is assumed that the characteristic according to the example shown in FIG. 3 is applied for mixing deconvolution and denoising. As mentioned above, deconvolution can be omitted in this example if the sampling density is in the undersampling regime A. Therefore, in step S3, the processor 108 determines whether or not the sampling density is equal to or larger than the Nyquist limit NL. If yes (Y), the sampling density is in the oversampling regime B, and the processor 108 performs deconvolution processing on the image pixel data in step S4. If no (N), step S4 is skipped, and deconvolution processing is not performed on the image pixel data. Accordingly, in step S5, deconvolved image pixel data is available if the deconvolution processing has been executed.

In step is S6, the processor 108 performs denoising processing on the image pixel data. Accordingly, in step S7, denoised image pixel data is available.

In step S8, the processor 108 determines the deconvolution weight W-DECON as a function of the sampling density based on characteristic shown in FIG. 3. With determining W-DECON, the complementary denoising weight W_DENOISE is also determined since W-DECON and W_DENOISE sum up to 1.

In step S9, the processor multiplies the deconvolved image pixel data made available in step S5 by the deconvolution weight W_DECON (in case that the sampling density is equal to or larger than the Nyquist limit NL). Accordingly, weighted deconvolved image pixel data is available in step S10.

In step is S11, processor 108 multiplies the denoised image pixel data made available in step S7 by the denoising weight W_DENOISE. Accordingly, weighted denoised image pixel data is available in step S12.

In step S13, the processor 108 adds the weighted deconvolved image pixel data and the weighted denoised image pixel data that have been made available in steps S10 and S12, respectively. Accordingly, mixed image pixel data is available in step S14, this data including the deconvolution and denoising results according to the weighting determined in step S8. In particular, the mixed image pixel data includes only the denoised image pixel data if the sampling density is in the undersampling regime A where the weight W-DENOISE is equal to 1. In contrast, the mixed image pixel data includes both the denoised image pixel data and the deconvolved image pixel data if the sampling density is in the oversampling regime where the weights W_DECON and W_DENOISE sum up to 1.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 5:
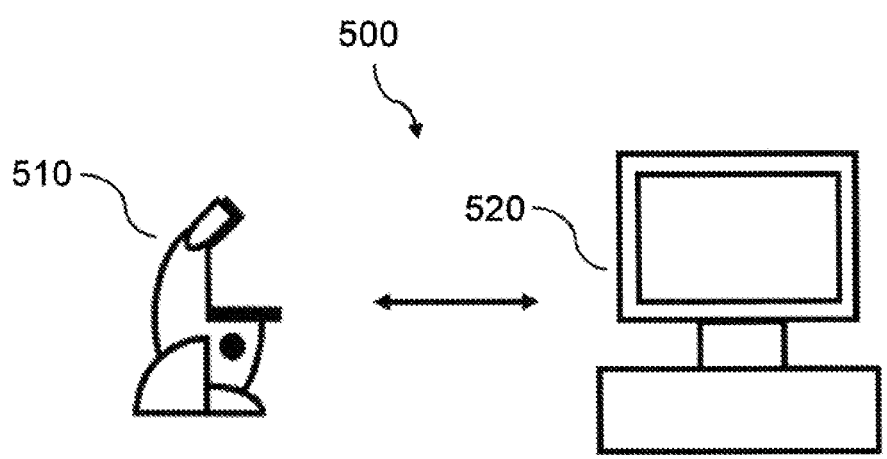
FIG. 5 shows a schematic illustration of a system to perform the method according to FIG. 4.

Some embodiments relate to a microscope comprising a system as described in connection with one or more of the FIGS. 1 to 4. Alternatively, a microscope may be part of or connected to a system as described in connection with one or more of the FIGS. 1 to 4. FIG. 5 shows a schematic illustration of a system 500 configured to perform a method described herein. The system 500 comprises a microscope 510 and a computer system 520. The microscope 510 is configured to take images and is connected to the computer system 520. The computer system 520 is configured to execute at least a part of a method described herein. The computer system 520 may be configured to execute a machine learning algorithm. The computer system 520 and microscope 510 may be separate entities but can also be integrated together in one common housing. The computer system 520 may be part of a central processing system of the microscope 510 and/or the computer system 520 may be part of a subcomponent of the microscope 510, such as a sensor, an actor, a camera or an illumination unit, etc. of the microscope 510.

The computer system 520 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 520 may comprise any circuit or combination of circuits. In one embodiment, the computer system 520 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 520 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 520 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 520 may also include a display device, one or more speakers, and a keyboard and/or controller, which can include a mouse, trackball, touch screen, voice-recognition device, or any other device that permits a system user to input information into and receive information from the computer system 520.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Some embodiments comprise the computer program for performing one of the methods described herein, stored on a machine readable carrier.

In other words, an embodiment of the present invention is, therefore, a computer program having a program code for performing one of the methods described herein, when the computer program runs on a computer.

An embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. An embodiment of the present invention is an apparatus as described herein comprising a processor and the storage medium.

An embodiment of the invention is, therefore, a data stream or a sequence of signals representing the computer program for performing one of the methods described herein. The data stream or the sequence of signals may, for example, be configured to be transferred via a data communication connection, for example, via the internet.

An embodiment comprises a processing means, for example, a computer or a programmable logic device, configured to, or adapted to, perform one of the methods described herein.

An embodiment comprises a computer having installed thereon the computer program for performing one of the methods described herein.

An embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 optical imaging system
104 detector
106 image processing system
108 processor
110 data collection module
112 controller
A undersampling regime
B oversampling regime
NL Nyquist limit

The invention claimed is:

1. An image processing system, comprising:
a processor,
wherein the processor is configured:
to obtain image pixel data generated by an optical imaging system of a microscope,
to perform deconvolution processing on the obtained image pixel data for generating deconvolved image pixel data,
to perform denoising processing on the obtained image pixel data for generating denoised image pixel data,
to obtain a sampling density based on which the image pixel data is generated by the optical imaging system, and
to mix the deconvolved image pixel data and the denoised image pixel data for generating mixed image pixel data with a weighting dependent on the sampling density to change a ratio of the deconvolved image pixel data in relation to the denoised image pixel data when the sampling density exceeds an oversampling limit.

2. The image processing system according to claim 1, wherein the oversampling limit is defined by a pixel size being smaller than a spatial resolution of the optical imaging system or as defined by a Nyquist criterion.

3. The image processing system according to claim 1, wherein the processor is configured to determine the weighting based on a characteristic representing a deconvolution weighting factor that increases monotonically and linearly or non-linearly with increasing sampling density at least in a range including the oversampling limit.

4. The image processing system according to claim 1, wherein the processor is configured to determine the weighting based on a characteristic representing a deconvolution weighting factor that is zero when the sampling density is smaller than the oversampling limit and that increases monotonically and non-linearly with increasing sampling density when the sampling density is equal to or greater than the oversampling limit.

5. The image processing system according to claim 3, wherein a monotonic and non-linear increase of the characteristic is predominantly limited to a range around or at the oversampling limit.

6. The image processing system according to claim 3, wherein the range including the oversampling limit has a width of one of the following: seven times, five times, three times, two times or one time of the spatial resolution of the optical imaging system.

7. The image processing system according to claim 1, wherein the processor is configured to generate the mixed image pixel data while changing the weighting as the sampling density varies.

8. The image processor according to according to claim 1, wherein the processor is configured to obtain the sampling density based on at least one imaging parameter and to determine the weighting in accordance with the sampling density.

9. The image processing system according to claim 1, wherein the processor is configured to perform the deconvolution processing based on a point spread function characterizing a spatial resolution of the optical imaging system.

10. The image processing system according to claim 1, wherein the processor is configured to generate the mixed image pixel data while real-time imaging is performed by the optical imaging system.

11. The image processing system according to claim 1, wherein the deconvolution processing and the denoising processing are performed at least one of independently and/or simultaneously.

12. The image processing system according to claim 1, wherein the deconvolution processing comprises at least one of the following: Wiener deconvolution, Richardson-Lucy deconvolution, blind deconvolution, FFT based deconvolution, Agard-Sedat deconvolution and/or Meinel deconvolution.

13. The image processing system according to claim 1, wherein the denoising processing comprises at least one of the following: smoothing, deblurring, averaging of multiple images, and/or background subtraction.

14. An image processing system according to claim 1, wherein image processing system is configured for widefield microscopy, laser scanning microscopy, fluorescence microscopy, transmitted or reflected light microscopy, multi-photon microscopy, super-resolution microscopy, interference contrast and/or polarization microscopy.

15. A microscope comprising an optical imaging system and an image processing system according to claim 1.

16. A method for image processing, comprising the following steps:
    obtaining image pixel data generated by an optical imaging system of a microscope,
    performing deconvolution processing on the obtained image pixel data to generate deconvolved image pixel data,
    performing denoising processing on the obtained image pixel data to generate denoised image pixel data,
    obtaining a sampling density based on which the image pixel data is generated by the optical imaging system, and
    mixing the deconvolved image pixel data and the denoised image pixel data to generate mixed image pixel data with a weighting dependent on the sampling density to change a ratio of the deconvolved image pixel data in relation to the denoised image pixel data when the sampling density exceeds an oversampling limit.

17. A non-transitory computer-readable medium storing process steps for performing the method according to claim 16 when executed on a processor.

* * * * *